United States Patent [19]
Sykes, Jr.

[11] 3,965,244
[45] June 22, 1976

[54] SELECTIVE REMOVAL OF SULFUR COMPOUNDS FROM ACID GAS MIXTURES CONTAINING SIGNIFICANT QUANTITIES OF CARBONYL SULFIDE

[75] Inventor: James A. Sykes, Jr., Houston, Tex.

[73] Assignee: Shell Oil Company, Houston, Tex.

[22] Filed: Nov. 27, 1974

[21] Appl. No.: 527,578

[52] U.S. Cl................................ 423/228; 423/226; 423/243
[51] Int. Cl.² ........................................ B01D 53/34
[58] Field of Search..................... 423/226, 228, 243

[56] References Cited
UNITED STATES PATENTS

| | | | |
|---|---|---|---|
| 2,083,213 | 6/1937 | Baehr............................. | 423/228 |
| 3,098,705 | 7/1963 | Bally.................................. | 423/243 |
| 3,266,866 | 8/1966 | Bally et al........................... | 423/226 |
| 3,347,621 | 10/1967 | Papadopoulos et al............. | 423/226 |

FOREIGN PATENTS OR APPLICATIONS

| | | | |
|---|---|---|---|
| 947,045 | 5/1974 | Canada.............................. | 423/226 |
| 2,062,138 | 6/1971 | France | |

*Primary Examiner*—Herbert J. Carter

[57] ABSTRACT

Acidic gases containing $H_2S$, $CO_2$ and substantial concentratiOns of COS are reduced in sulfur content by contacting said gases in a first stage at elevated temperatures with an aqueous polyalkanolamine solution containing at least 20% by weight of a tetramethylene sulfone wherein a substantial portion of the COS present is hydrolyzed to $H_2S$ and $CO_2$, after which the hydrolyzed acid gases consisting substantially of $H_2S$ and $CO_2$ are contacted in a second stage with an alkanolamine absorbent for $H_2S$ under conditions where $H_2S$ is selectively removed to low levels.

5 Claims, 1 Drawing Figure

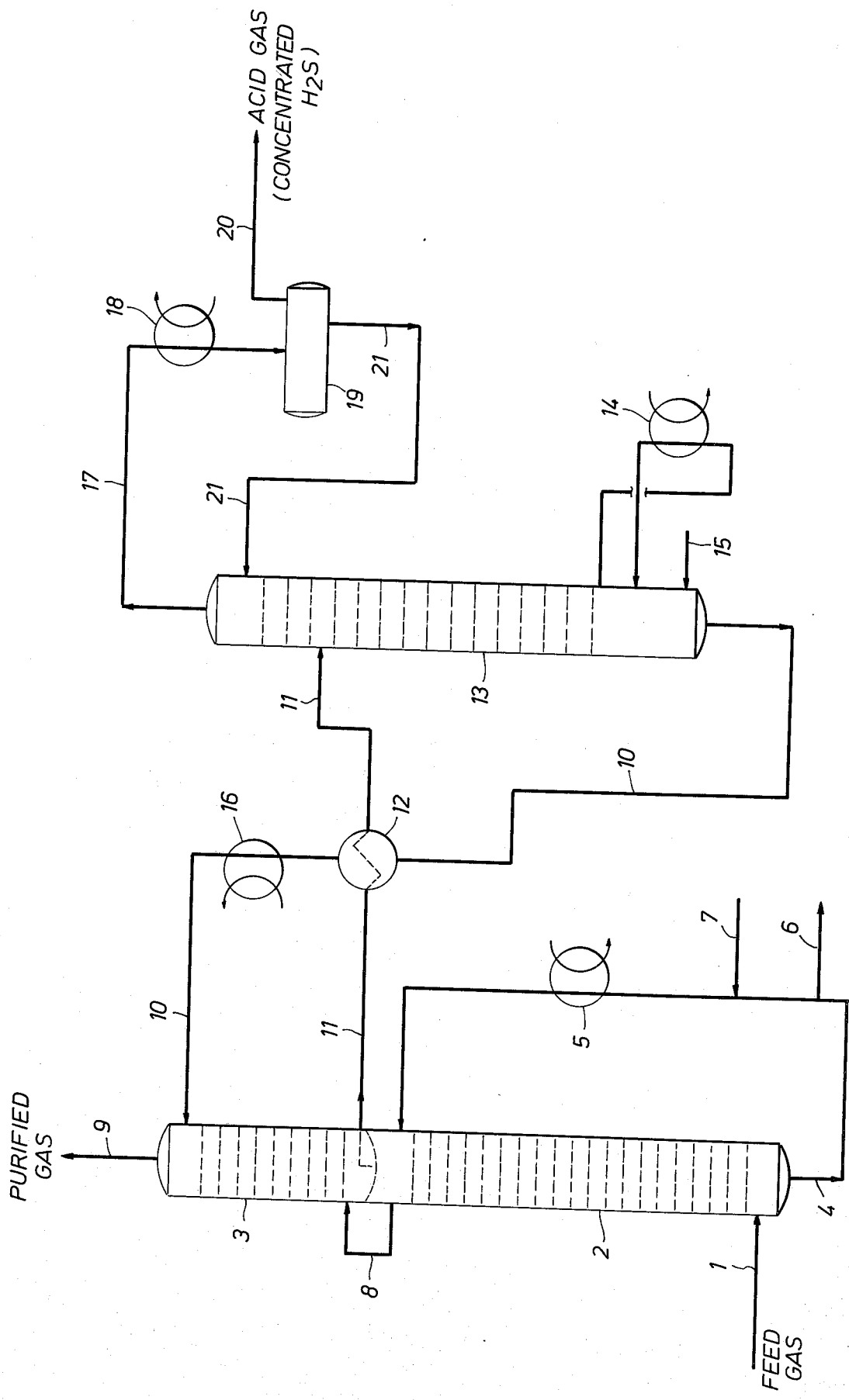

SELECTIVE REMOVAL OF SULFUR COMPOUNDS FROM ACID GAS MIXTURES CONTAINING SIGNIFICANT QUANTITIES OF CARBONYL SULFIDE

BACKGROUND OF THE INVENTION

The invention relates to a process for selective removal of sulfur compounds from gaseous mixtures containing $H_2S$, $CO_2$ and significant quantities of COS.

For a variety of industrial applications, it is necessary or desirable to reduce the sulfur content of a gaseous mixture containing significant quantities of COS in addition to $H_2S$ and $CO_2$ to low levels prior to further processing and/or utilization of the gaseous mixture. For example, sour gas available from certain natural gas reservoirs is known to contain up to about 0.1% by volume (1000 ppm) COS in addition to substantial quantities of $H_2S$ and $CO_2$. Since the COS present in the sour gas makes up part of the total sulfur, substantial removal of same, in addition to the $H_2S$ present, is necessary to meet many of the specifications for conventional end uses of such gas, e.g., residential heating and industrial uses. Further, in conventional partial combustion processes utilizing sour liquid hydrocarbon oils or sulfur-containing coals as the primary fuel source, a crude synthesis gas product is obtained which typically contains 100 to 500 ppm COS in addition to the $H_2S$ and $CO_2$ partial combustion by-products. In many cases this crude synthesis gas product is subject to further processing, e.g., contact with sulfur-sensitive CO-shift catalysts in hydrogen manufacture, or funneled to industrial and consumer end uses, e.g., as energy source in gas turbine generation of electricity or as a town gas for private consumption, which makes it desirable or even essential that the total sulfur content of the combustion gas be reduced to very low levels.

While reduction of the total sulfur content to low concentrations is required in most of these commercial applications, in a number of cases it is not necessary or desirable that carbon dioxide be removed from the gaseous mixture. For example, current pipeline specifications for natural gas permit relatively high concentrations of $CO_2$ in the product gas as compared to total sulfur which is restricted to very low levels. Additionally, in cases where a Claus plant is utilized to recover the sulfur from the acidic components of the gaseous stream, it is advantageous to selectively remove the sulfur-containing acid gas components (usually in the form of $H_2S$) from the gaseous mixture while leaving a substantial portion of the $CO_2$ in the treated gas stream, since $CO_2$ merely acts as a diluent in the Claus reactant gases leading to larger and less economic processing facilities and less efficient conversions to elemental sulfur.

Processes for the removal of acidic gases, such as $H_2S$ and $CO_2$, for gaseous mixtures containing the same well known in the art. In general, these processes involve scrubbing the gaseous mixture with a liquid absorbent in an absorption zone whereby the acidic gases are removed from the gaseous mixture and a loaded absorbent stream is obtained which is passed to a regeneration zone where the absorbent is heated and/or stripped with solvent vapor, e.g., stream, resulting in the release of the acidic gases. The regenerated absorbent is returned into contact with the feed gas mixture in the absorption zone while the evolved acidic gases are passed to a cooler/condenser in which the solvent vapors are condensed and separated from the acidic gases.

In this same context, a number of processes utilizing liquid absorbents have been proposed to improve the selectivity for $H_2S$ removal relative to $CO_2$. Among the more attractive of such processes are those which employ aqueous alkanolamine absorbent solutions for selective removal of $H_2S$ relative to the $CO_2$. While these aqueous alkanolamine absorbent-based processes are generally adequate for selective removal of sulfur compounds relative to $CO_2$, in cases where the chemically bound sulfur is present substantially in the form of $H_2S$, such processes become less effective and suffer from operational problems when substantial quantities of COS are present in the gaseous mixture to be treated. This is because COS exhibits absorption properties which closely resemble $CO_2$ and most of these processes rely substantially, or at least in part, on the inherent difference in the rate of absorption of $H_2S$ relative to $CO_2$ in the absorption solution — i.e., $H_2S$ selectivity being improved by reducing the contact time between the absorbent and the $H_2S$ and $CO_2$-containing gaseous mixture. In this regard see Canadian Pat. No. 947,045 and the Discussion of Prior Art in U.S. Pat. No. 3,266,866. Thus, when the absorption stage of the process is operated in a manner to achieve optimum selectivities for $H_2S$ relative to $CO_2$ by reliance on reduced contact times, very little of the COS will be absorbed by the alkanolamine absorbent and consequently will remain as a sulfur contaminant in the treated gas. It is known that COS can be removed by certain alkanolamine absorbent solutions including those which contain a tetramethylene sulfone, see for example, U.S. Pat. No. 3,347,621. However, in these instances the absorption stage of the process is operated in a manner such that all acidic components, including $CO_2$ present, are absorbed. In any case, even if some intermediate set of processing conditions could be selected where COS would be removed without absorbing substantially all of the $CO_2$ present in the gaseous mixture, the close similarity in the absorption properties of $CO_2$ and COS would still result in more $CO_2$ absorption than would occur when little or no COS is present in the gas mixture to be treated. Furthermore, at some stage of the absorption and/or regeneration process, it is anticipated that at least some of the COS would be hydrolyzed to $CO_2$ and $H_2S$ by the basic aqueous absorption solution; and consequently, the $CO_2$ content of the absorbent and/or desorbed gases on regeneration would be increased. In practical terms this would mean that greater quantities of absorbent would have to be circulated through the processing scheme and the processing equipment sizing, e.g., gas-absorbent contactor and regeneration unit, would have to be larger since more total moles of absorbed acid gas would have to be handled. Further, in any case, the concentration of sulfur compounds in the recovered acid gases would always be lowered which could be especially critical in cases where the removed acid gases are passed to a Claus unit for recovery of the sulfur contained therein, since the economy and efficiency of the Claus unit is predicated to a substantial degree on the $H_2S$ content of the feed gas.

Accordingly, it would be very advantageous if a process was available for reducing the total sulfur content of gaseous streams containing significant concentrations of COS, in addition to $H_2S$ and $CO_2$, down to low levels in which the selectivity for removal of sulfur compounds over $CO_2$ is not sacrificed and the operational problems associated therewith are substantially overcome.

SUMMARY OF THE INVENTION

It has now been found that the total sulfur content of gaseous mixtures containing substantial quantities of COS in addition to $H_2S$ and $CO_2$ can be removed to very low levels with minimal concomitant removal of $CO_2$ in a continuous process employing conventional $H_2S$-selective alkanolamine absorbents and processing schemes in the absorption stage of the process. This surprising result is obtained if the gaseous mixture to be treated is first contacted in a separate process zone with an aqueous polyalkanolamine solution containing at least 30% by weight of a tetramethylene sulfone at elevated temperatures in a manner such that solution is saturated with $CO_2$ and $H_2S$ and a constant or steady state concentration of acid gases consisting substantially of $CO_2$ and $H_2S$ is obtained in the gas phase of this first processing zone, which gas is then passed to the conventional absorption stage of the process. At the process conditions described for this first contacting stage, a substantial portion of the COS present in the incoming gas mixture is absorbed by the polyalkanolamine solution (due primarily to the sorption activity of the sulfone present therein) hydrolyzed to $CO_2$ and $H_2S$ and the hydrolysis products are desorbed according to the equilibrium solubilities of these components in the system. In any case the net result from this first contacting stage is the obtaining of a gas phase containing acidic components substantially in the form of $H_2S$ and $CO_2$, which acid gas components are present at a substantially constant concentration. The gas phase so obtained is then passed to a conventional selective $H_2S$ removal processing sequence employing conventional alkanolamine absorbents, which has been purposely designed for optimum selective operation at the acid gas composition of the gas phase from the first stage.

Accordingly, in its broadest aspects the instant invention provides a continuous process for selective removal of sulfur compounds from gaseous mixtures containing $CO_2$, $H_2S$ and substantial concentrations of COS which comprises;

a. contacting said gas mixture in a first stage at elevated temperature with an aqueous polyalkanolamine solution containing at least 20% by weight of a tetramethylene sulfone, said aqueous polyalkanolamine solution being saturated with $CO_2$ and $H_2S$ at the partial pressures of said components in the acid gas feed mixture, thereby absorbing and hydrolyzing a substantial portion of the COS present in said acid gas feed mixture to form and maintain a steady state concentration of acid gas consisting substantially of $CO_2$ and $H_2S$ in the gas phase of the first stage;

b. withdrawing said gas phase from the first stage and contacting it in a second stage with a regenerable $H_2S$-selective, aqueous alkanolamine absorbent solution to afford a substantially $H_2S$-free, treated gas mixture which contains a large portion of the $CO_2$ originally present in the gas phase withdrawn from the first stage and an absorbent solution loaded with absorbed $H_2S$;

c. regenerating the $H_2S$-loaded absorbent solution thereby liberating $H_2S$ and d. returning the regenerated absorbent into contact with the gas phase in the second stage of the process.

THE DRAWING

The invention will be described in greater detail with reference to the accompanying drawing which is a schematic representation of one embodiment according to the process of the invention.

DETAILED DESCRIPTION OF THE INVENTION

As indicated above, the primary advantage of the process of the instant invention lies in its ability to selectively reduce the total sulfur content of gaseous mixtures containing substantial concentrations of COS in addition to $H_2S$ and $CO_2$ while allowing a large portion of the $CO_2$ originally present in the gaseous mixture to remain in the treated gas. Accordingly, the types of gaseous mixtures which may be suitably processed with the invention include the aforementioned crude partial combustion gases derived from sulfur-containing liquid or solid hydrocarbonaceous feedstocks — e.g., crude oil, processed crude oil fractions, coal, processed liquid and solid fractions derived from coal and oil shale etc., — and the sour gas streams originating from natural gas reservoirs. Additionally, sulfur compounds including COS and $H_2S$ are known to occur in other industrial gases such as coke oven gas or petroleum gases produced by cracking or other refinery operations from sulfur-containing feeds. Generally, gases from any of these aforementioned natural and industrial sources will not contain COS in an amount which exceeds about 0.1% by volume (1000 ppm). Since the advantages of the invention are less apparent at lower COS concentrations, gases to be treated according to this invention desirably contain at least 50 ppm of COS. Preferably, the COS concentration in the gaseous mixture will range between about 50 and about 1000 ppm. The remainder of the gaseous mixtures, besides containing $H_2S$ and $CO_2$ in significant amounts, respectively, may be made up of $H_2$, CO, $N_2$, various low-boiling hydrocarbons, e.g., methane, ethane and propane, and the like.

In the first stage of the process the hydrolysis of COS is facilitated by passing the crude gas mixture containing COS, $H_2S$ and $CO_2$ into contacting zone wherein the polyalkanolamine solution containing a tetramethylene sulfone is maintained at elevated temperatures in a manner such that the polyalkanolamine solution is saturated with $CO_2$ and $H_2S$ at the partial pressure of said components in the acid gas feed mixture and a constant or steady state concentration of acid gas components consisting substantially of $CO_2$ and $H_2S$ is maintained in the gas phase of that zone. On contacting the polyalkanolamine solution present in this first zone, the COS component of the acid gas feed mixture is substantially absorbed by the solution and hydrolyzed to $CO_2$ and $H_2S$, which in turn are subsequently distributed in the gas and/or liquid phases present in the zone according to the equilibrium solubilities of said components in the aqueous polyalkanolamine solution. One of the surprising aspects of this stage of the process, which goes to the essence of its operability under the practical use conditions for a continuous process of this nature, is the finding that the tetramethylene sulfone component of the polyalkanolamine solution exhibits sufficient affinity for COS that rapid transfer of COS from the gas phase to the liquid phase will occur at the elevated temperatures necessary to promote COS hydrolysis, even when the polyalkanolamine solution is saturated with $CO_2$ and $H_2S$ at the partial pressures of said components in the gas feed mixture. This finding, combined with the fact that COS hydrolysis occurs readily at the contemplated process conditions, facilitates the attainment of a constant or steady state acid gas composition consisting substantially of $CO_2$ and $H_2S$ in the gas phase of this first stage within the practical limits of equipment sizing, gas/solution ratios and feed rates and without requiring that the contacting solution be regenerated or replaced to any significant degree. Accordingly, it is essential that the tetramethylene sulfone component be present in the aqueous polyalkanolamine solution at least to the extent of 20% by weight of the total solution, if practical operation is to be achieved. Preferably, the quantities of sulfone employed ranges from 20 to 65% by weight with concentrations in the range of 40 to 55% by weight being most preferred. In this same context, the polyalkanolamine solution may suitably contain 20 to 50% by weight of a polyalkanolamine and 5 to 15% by weight water. Preferred ranges for these latter components are 35 to 40% by weight and 10 to 15% by weight for polyalkanolamine and water, respectively.

The tetramethylene sulfones which are suitable for use in the instant invention are well known in the art, the unsubstituted compound also being known as sulfolane. Suitable sulfolanes (substituted and unsubstituted) contain only from zero to two substituent radicals and they are alkyl of from 1 to 4 carbon atoms, with a total of 4 alkyl carbon atoms, the alkyl radicals being attached to different ring carbon atoms. Preferred substituted sulfolanes are those having methyl substituents. Representative substituted sulfolanes are 2-methyl solfolane, 3-methyl sulfolane, 2,3-dimethyl sulfolane, 2,4-dimethyl sulfolane, 3,4-dimethyl sulfolane, 3-ethyl sulfolane and 2-methyl, 5-propyl sulfolane.

Suitably the aqueous polyalkanolamine solution employed in the first stage of the instant process is made up of a polyalkanolamine such as diethanolamine, triethanolamine or one or more dipropanolamines. Examples of dipropanolamines are di-n-propanolamine, n-propanolisopropanolamine and diisopropanolamine, and mixtures thereof. The use of diisopropanolamine is preferred since this compound is generally available and in good purity. However, use may also be made of technical mixtures of dipropanolamines, such as are obtained as by-product in the preparation of diethanolamine. Such technical mixtures usually consist of more than 90% by weight of diisopropanolamine and of 10% by weight or less of mono- and tripropanolamines; a significant quantity of diethanolamine may also be present. In cases where diisopropanolamine is employed, it is particularly preferred that the tetramethylene sulfone component of the solution be sulfolane.

As indicated previously, it is an essential element of the instant invention that the gas phase withdrawn from the first or COS-hydrolysis stage of the process be made up of a substantially constant or steady state concentration of acid gas consisting substantially of $CO_2$ $H_2S$. Further, as indicated previously, this objective can be achieved under practical use conditions in a continuous process because the transfer of COS from the gas phase to the liquid phase is relatively rapid and the hydrolysis of COS to $H_2S$ and $CO_2$ occurs fairly readily at elevated temperatures. Within this context some general operating parameters relating to the extent of gas-liquid contact and the temperature of the contacting solution can be specified wherein this objective is achieved with typical feed gas compositions and practical equipment limitations. Of course, one skilled in the art will realize that variations in these process conditions will occur where intense gas-liquid contacting procedures are used, e.g., colloid mill mixing, or where ususually high or low concentrations of $CO_2$ and/or $H_2S$ are present in the gas mixture to be treated.

In the case of the extent of gas-liquid contact required for substantial absorption of the COS, the most basic parameters are residence time in the contacting zone and the mass ratio of hydrolysis solution to gas feed in the contacting zone. Suitably the residence time of the gas-liquid contact in this first stage ranges from 5 to 120 seconds and preferably from 20 to 90 seconds. Within this same context, the mole ratio of polyalkanolamine solution in the first stage to acid gas feed rate to the first stage (assuming equivalent gas feed and withdrawal rates from the first stage) suitably ranges between 1. and 3. and preferably between 1 and 2 based on the molar quantities of the two components. The lower limit of this hydrolysis solution/gas feed ratio is of most significance because the solubility and hydrolysis of COS decreases with increased acid gas loadings. The temperature of the polyalkanolamine solution in contact with the gaseous feedstock in the first stage of the process suitably ranges between 50° and 90°C, with temperatures in the range of 65° to 80°C being preferred.

Procedurally, this first or COS hydrolysis stage can be carried out with any conventional technique for establishing contact between a flowing gas stream and a liquid maintained at elevated temperatures. For example, this first step is suitably carried out by bubbling the gaseous mixture through an enclosed reservoir (tank) of hot solution, said solution being maintained at elevated temperatures via indirect heat exchange, e.g., steam coils immersed in the reservoir. In this case the extent of contact between the gas and liquid can be controlled by a variety of means, e.g., size and shape of liquid mass, gas flow rates, etc., well known to those skilled in the art. Preferably, this first stage is carried out by countercurrently contacting the gaseous feed mixture with the aqueous polyalkanolamine solution in a vertically oriented column wherein the gaseous feed is introduced just above the bottom of the column and the solution is continuously recirculated from the bottom of the column through a heat exchanger to maintain the desired solution temperature and back into the top of the column. In this case, the residence time of gas-liquid contact and the intimacy of contact is established and maintained by insertion of a conventional packing material, e.g., Raschig rings, or a plurality of contacting trays — e.g., valve trays, bubble cap trays or perforated plates — in the column. The hydrolyzed gaseous mixture containing a steady state concentration of acid gases consisting substantially of $CO_2$ and $H_2S$, in this case, is continuously withdrawn from the vapor phase above the packed, liquid portion, or the last contacting stage, of the column. When countercurrent contacting procedures employing vertical columns with a plurality of contacting trays are utilized in this first stage, substantial hydrolysis of COS and a steady state concentration of acid gas consisting substantially of $CO_2$ and $H_2S$ will be obtained for a large portion of the typical gaseous feeds with columns containing 10 to 30 contacting trays at superficial gas velocities ranging from 1 to 3 feet per second. Most preferably, the COS hydrolysis stage and the subsequent selective $H_2S$ absorption stage of the process are carried out in a single, segregated column equipped with contacting trays as described above. In this embodiment the lower segregated portion of the column comprises the first stage of the process wherein the aqueous polyalkanolamine solution is recirculated in the manner described to give substantial hydrolysis of the gaseous feed mixture containing COS. The gas phase at the top of this lower segregated portion of the column is continuously withdrawn and, optionally after cooling via indirect heat exchange, is introduced into the top portion of the column where it is contacted with an $H_2S$-selective alkanolamine solution under conditions for selective absorption of $H_2S$ at the steady state gas composition of the hydrolyzed gas mixture. In any of the above described procedures, a small portion of the polyalkanolamine solution utilized in the first process stage is suitably withdrawn, e.g., as a slip stream in cases where the solution is recirculated, and subject to a reclaiming procedure to remove other gas impurities such as cyanides, etc., which may build up over an extended period of operation. To maintain a constant mass of hydrolysis solution in this first stage, the reclaimed solution or fresh solution is then introduced in compensating amounts into the first stage solution mass, e.g., into the recirculated solution prior to it introduction back into the contacting column.

The pressure employed in the first stage of the instant process is not critical to the obtaining of the desired steady state concentration of hydrolyzed acid gases and as such may range from atmospheric up to 2000 psig depending on the particular use made of the process. However, for practical reasons, i.e., need to process high pressure gaseous feeds with minimal loss of pressure, the pressure in this first stage suitably ranges between 200 psig and 1200 psig.

The subsequent stages of the instant process relating to selective $H_2S$ removal — i.e., $H_2S$ absorption with an aqueous alkanolamine solution, regeneration of the loaded absorbent, etc. — can be suitably carried out by anyone of several processing techniques employing alkanolamine absorbents which are known to selectively remove $H_2S$ from gaseous mixtures containing significant amounts of $CO_2$. Since many of these known procedures attach better $H_2S$ selectivity, at least in part, to the use of lower temperatures in the $H_2S$ absorption stage of the process, the gas phase withdrawn from the first stage of the process containing a steady state concentration of acidic components consisting substantially of $H_2S$ and $CO_2$ is preferably cooled by means of indirect heat exchange to a temperature below about 45°C prior to its introduction into the selective $H_2S$ absorption stage of the process. Suitable procedures for the selective $H_2S$ removal phase of this process are described in U.S. Pat. No. 2,083,213, which relies on a combination of short gas-absorbent contact times and a contacting procedure wherein the absorption liquid is brought into contact with the gas in finely divided or atomized form and in U.S. Pat. No. 3,266,866 which relies on chemical modification of an alkanolamine absorbent (through carbamate addition or in situ formation) to reduce its capacity to absorb $CO_2$. The disclosures of these aforementioned patents are herewith incorporated by reference.

A preferred procedure for the selective $H_2S$ removal phase of this procedure is the one described in Canadian Pat. No. 947,045. In this preferred procedure, selective $H_2S$ absorption is effected via countercurrent contact of the gas with an aqueous alkanolamine solution in a tray column such as those described above at a low temperature, e.g., below 45°C and preferably from 5° to 35°C, and high gas velocity, e.g., at least 3 ft/sec and preferably 6–12 ft/sec, (based on "active" or areated tray surface), said tray column having fewer than 20 contacting trays, e.g., 4–16 trays being typically employed. After selective removal of $H_2S$, the alkanolamine solution is regenerated by passing the loaded solution into a regenerator at a temperature of preferably 80°C–120°C. In this regenerator the absorbed components and any hydrolysis products formed are stripped by the steam which is generated in the boiling solution. Heating of the solution to be regenerated may very suitably be effected by means of indirect heating with low-pressure steam. It is also possible, however, to use direct injection of steam.

Suitable alkanolamines which may be employed in the $H_2S$ removal phase of the instant process include alkyl dialkanolamines, e.g., methyldiethanolamine, triethanolamine, or one or more dipropanolamines such as di-n-propanolamine or diisopropanolamine. Of the foregoing, aqueous methyldiethanolamine, triethanolamine and dipropanolamine solutions are preferred hydrogen-sulfide selective absorbents, particularly aqueous diisopropanolamine and methyldiethanolamine solutions. An especially preferred absorbent for treating gas at higher pressures, e.g., natural gas at pressure of 100 to 1200 psig, is an aqueous diisopropanolamine solution which additionally contains a minor amount of a physical solvent such as a substituted or unsubstituted tetramethylene sulfone of the type described above i.e., sulfolane. Either high purity diisopropanolamine or technical mixtures of dipropanolamine, such as are described above, may be used. The concentration of the aqueous alkanolamine solution may vary between relatively wide limits. In general, the concentration of alkanolamine will be from 5 to 60% by weight, and preferably between 20 and 50% by weight. If a physical solvent is employed as a component of the absorbent liquid, it can be present in an amount of from 2 to 50% by weight, preferably from 5 to 25% by weight.

The invention will now be further described by reference to the Figure showing an embodiment of the process in accordance with the invention.

In the embodiment shown, a gas containing 3–5% by volume $CO_2$, 0.2–1.0% by volume $H_2S$ and 100–500 ppm of COS is introduced through line 1 into the bottom of the lower portion of a segregated gas-liquid countercurrent contacting column said contacting column being divided into a lower or COS hydrolysis section, 2 and an upper or selective $H_2S$ absorption section, 3. In the COS hydrolysis section, 2, of the column which is equipped with 20 contacting trays, the gas at an inlet temperature of about 50°C is passed upwardly into countercurrent contact with a COS hydrolysis solution made up of 10% by weight $H_2O$, 35% by weight diisopropanolamine (DIPA) and 55% by weight solfolane, which is recirculated from the bottom of the hydrolysis section to a point just above the top contacting tray in the hydrolysis section 2, via line 4. The temperature of the COS hydrolysis solution during contact with the feed gas 1, is maintained at about 65°C by passing the recirculated solution in line 4 through heat exchanger 5. Optionally, a small portion of the recirculated hydrolysis solution may be withdrawn from the recirculation line 4, via line 6 and sent to a reclaimer to remove impurities such as cyanides which may build up over an extended period of time in the recirculated solution. In this case, a small portion of fresh or reclaimed solution is added back into the recirculation loop 4 via line 7 to maintain a constant composition ratio in the system. After countercurrent contact with the hot hydrolysis solution a gas phase collects at the top of the hydrolysis section of the column 2, which contains a constant or steady state concentration of acid gas compounds consisting substantially of $CO_2$ and $H_2S$ at levels of about 3–6% by volume and 0.2–1.2% by volume, respectively with the COS content being reduced to less than 1 ppm. This gas phase is passed via line 8, after optional cooling via indirect heat exchange (not shown), into the bottom portion of the upper or selective $H_2S$ absorption section 3, of the segregated contacting column equipped with less than 20 (in this case 9) contacting trays. Regenerated $H_2S$-selective absorbent liquid containing 50% by weight DIPA, 35% by weight $H_2O$ and 15% by weight sulfolane is introduced into the top of the absorption section of the column 3 at a temperature of about 45°C through line 10 while "loaded" absorbent solution is withdrawn through line 11 and the treated gas having a substantially reduced $H_2S$ content, e.g., 5–50 ppm, and containing most of the $CO_2$ in the original feed stream, is withdrawn through line 9. The loaded absorbent solution is passed through heat exchanger 12 and subsequently introduced into the upper part of regeneration column 13, wherein it is stripped of absorbed acid gas components (primarily $H_2S$ and some $CO_2$). The necessary heat is supplied by reboiler 14 and/or live steam introduced through line 15. The regenerated absorbent solution is recycled to the absorption column by means of line 10, being cooled to the desired temperature for selective absorption by indirect cooling in exchanger, 16. Make-up absorbent solution can be added to this line or to the absorption section of the column as required. The vapors resulting from stripping, comprising mainly $H_2S$, $CO_2$ and steam, are withdrawn from the top of the regeneration column through line 17 and are passed to gas-liquid separator 19 via condenser 18. The acid gas containing concentrated $H_2S$ and some $CO_2$ is withdrawn from the separator through line 20 while the condensed water vapor is withdrawn through line 21 and is recycled to the top of the regeneration column. The recovered $H_2S$ may be used for the manufacture of sulfur or sulfuric acid or other suitable purpose.

What is claimed is:

1. A continuous process for selective removal of sulfur compounds from a feed gas mixture containing $CO_2$, $H_2S$ and at least 50 parts per million of COS which comprises;

a. contacting said feed gas mixture in a first stage at a temperature of from 50°C to 90°C with an aqueous polyalkanolamine solution containing at least 20% by weight of a tetramethylene sulfone, said aqueous polyalkanolamine solution being saturated with $CO_2$ and $H_2S$ at the partial pressures of said components in the acid gas feed mixture, thereby absorbing and hydrolyzing a substantial portion of the COS present in said acid gas feed mixture to form and maintain a steady state concentration of acid gas consisting substantially of $CO_2$ and $H_2S$ in the gas phase of the first stage;

b. withdrawing said gas phase from the first stage and contacting it in a second stage with a regenerable $H_2S$-selective, aqueous alkanolamine absorbent solution to afford a substantially $H_2S$-free, $CO_2$-containing treated gas mixture and an absorbent solution loaded with absorbed $H_2S$;

c. regenerating the $H_2S$-loaded absorbent solution thereby liberating $H_2S$; and, d. returning the regenerated absorbent into contact with the gas phase in the second stage of the process.

2. The process of claim 1 wherein the aqueous polyalkanolamine solution employed in the first stage contains 20 to 65% by weight of a tetramethylene sulfone, 20 to 50% by weight of a polyalkanolamine and 5 to 15% by weight water.

3. The process of claim 2 wherein the total pressure in the first stage ranges between atmospheric and 2000 psig.

4. The process of claim 2 wherein the tetramethylene sulfone component of the aqueous polyalkanolamine solution employed in the first stage is sulfolane.

5. The process of claim 4 wherein the polyalkanolamine component of the aqueous polyalkanolamine solution employed in the first stage is selected from the class consisting of di-n-propanolamine, n-propanolisopropanolamine and diisopropanolamine.

6. The process of claim 5 wherein the polyalkanolamine is diisopropanolamine.

7. The process of claim 2 wherein the feed gas mixture is contacted with the aqueous polyalkanolamine solution in the first stage in a manner such that the residence time of the gas liquid contact ranges from 5 to 120 seconds and the mole ratio of polyalkanolamine solution in the first stage to gas feed rate to the first stage ranges between 1 and 3 based on the molar quantities of the two components at equivalent gas feed and withdrawal rates from the first stage.

8. The process of claim 2, wherein the first stage of the process is carried out by countercurrently contacting the gaseous feed mixture with the aqueous polyalkanolamine solution in a vertically oriented column wherein the gaseous feed is introduced just above the bottom of the column and the solution is continuously recirculated from the bottom of the column through a heat exchanger to maintain the desired solution temperature and back into the top of the column.

9. The process of claim 8, wherein the gaseous feed mixture is passed through a vertically oriented column containing 10–30 contacting trays at a superficial gas velocity of 1 to 3 ft/sec.

10. The process of claim 2, wherein the gas phase withdrawn from the first stage is cooled to a temperature below 45°C prior to contacting the regenerable $H_2S$-selective, aqueous alkanolamine absorbent solution in the second stage.

11. The process of claim 10, wherein selective $H_2S$ absorption is effected in the second stage by countercurrent contact of the gas withdrawn from the first stage with an aqueous alkanolamine solution in a tray column having less than 20 contacting trays at a temperature below 45°C and a gas velocity of at least 3 ft/sec.

12. The process of claim 2, wherein the alkanolamine component of the aqueous alkanolamine absorbent solution employed in the second stage is selected from the class consisting of methyldiethanolamine, triethanolamine, di-n-propanolamine and diisopropanolamine.

13. The process of claim 12, wherein the aqueous alkanolamine solution employed in the second stage contains a minor amount of sulfolane.

14. The proccess of claim 13, wherein the alkanolamine component is diisopropanolamine.

15. The process of claim 14, wherein the first and second stages of the process are carried out in a single segregated column equipped with contacting trays such that the lower segregated portion of the column comprises the first stage of the process wherein the aqueous polyalkanolamine solutin is recirculated in countercurrent contact with the feed gas mixture to give substantial hydrolysis of the gaseous feed mixture and the hydrolyzed gas phase at the top of this lower segregated portion of the column is continuously withdrawn and introduced into the top portion of the column where it is countercurrently contacted with an $H_2S$-selective alkanolamine solution under conditions for selective absorption of $H_2S$ at the steady stage gas composition of the hydrolyzed gas mixture.

* * * * *